Nov. 8, 1927.
W. H. SCHULZE
1,648,200
SHAFT AND DETACHABLE GEAR
Filed Nov. 3, 1924
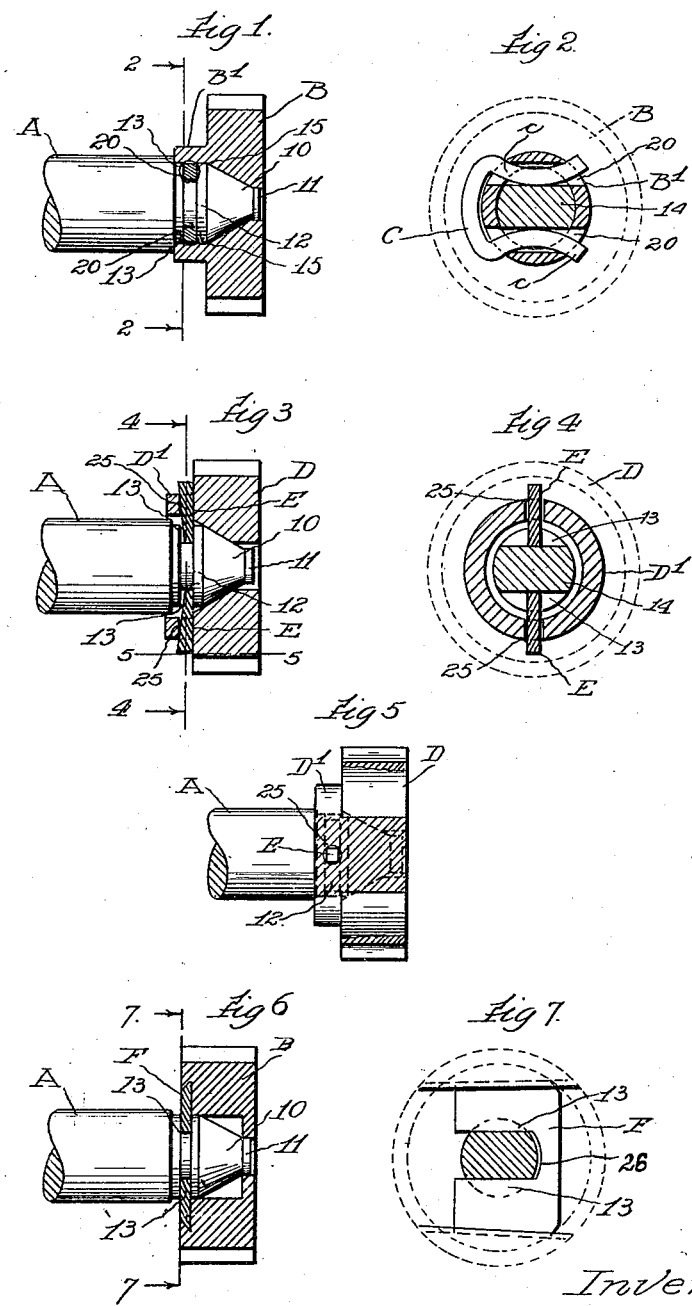

Patented Nov. 8, 1927.

1,648,200

UNITED STATES PATENT OFFICE.

WILLIAM H. SCHULZE, OF CHICAGO, ILLINOIS, ASSIGNOR TO STEWART-WARNER SPEEDOMETER CORPORATION, OF CHICAGO, ILLINOIS, A CORPORATION OF VIRGINIA.

SHAFT AND DETACHABLE GEAR.

Application filed November 3, 1924. Serial No. 747,422.

The purpose of this invention is to provide an improved construction of a shaft and detachable gear with means for attaching the gear to the shaft, adapted to facilitate disengagement of the gear for repair replacement or for substituting a different gear. It consists in the elements and features of construction shown and described as indicated in the claim.

In the drawings:

Figure 1 is a section axial with respect to the shaft of a shaft and detachable gear embodying this invention in one of its forms.

Figure 2 is a section at the line, 2—2, on Figure 1.

Figure 3 is a view similar to Figure 1 showing a second form of the invention.

Figure 4 is a section at the line, 4—4, on Figure 2.

Figure 5 is a detail section at the line, 5—5, on Figure 3.

Figure 6 is a view similar to Figure 1, showing a third form of the invention.

Figure 7 is a section at the line, 7—7, on Figure 6.

In all the forms shown the shaft, A, has a gear-centering terminal comprising a conically tapered part, 10, a cylindrical terminal, 11, corresponding in diameter to the least diameter of said tapering part, and a cylindrical part, 12, having a diameter equal to the greatest diameter of the conical part, 10. Back of the terminal portion of the shaft it has two opposite parallel cross slots or grooves, 13, 13, reducing the shaft in cross section to a neck portion 14, and forming rearwardly facing shoulders, 15. Referring to the form shown in Figures 1 and 2, the gear, B, has a hub, B¹, and is axially apertured through both the main body and the hub, the aperture corresponding in diameter at different parts of its axial extent with the diameter of the shaft terminal at corresponding parts,—that is to say, so that the shaft comprising the cylindrical portion, 11, the conical portion, 10, and the larger cylindrical portion, 12, in which the cross slots are formed fits in the axial bore of the gear. Through the hub, B¹, there are formed two parallel round holes or bores, 20, 20, equally distant at opposite sides of a diametric plane and in position to register with the cross slots, 13, 13, of the shaft when the gear is thus seated on the shaft terminal. For disengageably attaching or securing the gear to the shaft in this position there is provided a U-shaped key member, C, of spring metal having its limbs c, c, rectangular in cross section and dimensioned for entering the round holes or bores, 20, and sliding in the cross slots, 13, 13, of the shaft. The diameter of the bores is somewhat greater than the dimension of the key limbs, c, transversely of the shaft, and the said limbs are curved as seen in Fig. 2 so that when inserted and somewhat flattened as to their curvature as their elasticity permits, they engage tightly in the said bores, notwithstanding their dimensions being less than the diameter of the bores. It will be understood that when the key member is thus inserted through the gear hub and shaft, by reason of the elastic reaction of the arms of the key and the relative dimensions of the parts, as described, the gear is held snugly seated on the tapering portion, 10, of a shaft terminal, the key being stopped against the rearwardly facing shoulders, 15, and held from rotation about the shaft, and holding the gear against such rotation by the seating of the inner edges of the key limbs on the seats formed by the bottom of the cross slots, 13, in the shaft. Thus the key is engaged both as against both rotative and axial displacement with respect to the shaft and is also engaged with the gear against relative displacement either axially or rotatively.

In the form shown in Figures 3, 4 and 5, the shaft is identical in all its features with that shown in Figures 1 and 2. In this form the gear, D, has a hub, D¹, quite similar to the form shown in Figures 1 and 2, but differing in that instead of the two transverse bores at opposite sides of a diametric plane, the hub, D¹, has a single bore diametrically positioned and resulting in two diametrically aligned holes, 25, 25, at opposite sides of the axis. In this form the shaft is adapted to be seated in the gear as in the form shown in Figures 1 and 2, and for the purpose of securing it as about to be described, it is so seated with the neck, 14, positioned as to its longer dimension directly transversely of the diametrically aligned holes, 25, 25; and for securing the gear to the shaft there are provided two similar wedges, E, E, dimensioned for being driven into the holes, 25, tightly and becoming tight therein when the ends of the wedges, which are directly transverse to their length, are seated and stopped on the key seats formed by the opposite flat sides of the neck, 14. It will be understood that by this construction and mode of assembling, the gear is, in the first place, clamped by the wedging action onto the tapered portion, 10, of the shaft, and by the wedges when they are tight in the gear seating at their inner ends on the key seats of the shaft, the gear is held non-rotatable with respect to the shaft.

In the form shown in Figures 6 and 7, the shaft is in the same form as in the figures previously described, and the gear is without a hub, that is, it is uniform in its axial dimension throughout its entire diameter, and it has formed in the back side a transversely extending groove slightly tapered narrowing from one end to the other and having its opposite sides undercut and preferably in bevel form, rendering it a dove-tail slot. For securing the gear to the shaft there is provided a dove-tail key plate, F, slightly tapered longitudinally to correspond with the taper of the slot, and this key, F, has midway in its width, a deep notch, 26, rendering it fork shaped and adapted to stride the narrower dimension of the neck, 14, of the shaft and to engage tightly between the opposite shoulders, 15 and 16, formed by the cross slots which produce said neck. The gear in this form has a central aperture which at the forward side is of a diameter to seat upon the small cylindrical terminal, 11, of the shaft, the gear being counter-bored from the back side to the full diameter of the larger cylindrical portion, 12, of the shaft, the counter-bore extending to within the distance from the forward side or face of the gear substantially equal to the width of the smaller cylindrical terminal, 11, of the shaft.

It may be understood that in this form the gear is applied to the shaft by the shaft terminal being inserted from the back side through the counterbore, seating its terminal, 10, in the central small bore of the shaft, the larger cylindrical portion, 12, seating simultaneously at the rear side of the gear in the rear end portion of the counterbore, and the gear thus seated is rotatively adjusted to bring the sides of the dove tail slot into symmetrical position with respect to the neck, 14, of the shaft; and the key plate, F, is then introduced at the wider end of the dove-tail slot, its fork notch, 26, being engaged with the neck of the shaft, and it is then driven home,—that is, until it is seated tightly in the dove-tail groove; and in this process any slight inaccuracy in the initial adjustment of the gear on the shaft will be corrected by the slight rotation of the gear due to the engagement of the fork notch of the key with the neck of the shaft while the edges of the key are engaged under the overhanging shoulders of the dove-tail groove. It will be understood that the construction in this form, as in the other forms, causes the gear to be held on the shaft rigidly as against displacement either rotatively or axially.

I claim:—

In combination with a shaft, a disengageable gear and an attaching device, the shaft having a relatively short and correspondingly wide-angled tapering area for seating and centering the gear and having at its opposite sides cross slots at a transaxial plane back of said centering area, said slots forming at their bottoms stop shoulders adapted to operate as key seats, the gear having a correspondingly short and wide-angled tapering central bore for seating on said tapered area of the shaft and having transverse channels back of said tapered bore positioned for registering approximately with the cross slots of the shaft, and wedge-like attaching means enterable through the channels of the gear into the cross slots of the shaft and dimensioned for encountering said key seats at the limit of their insertion for wedging the gear onto said tapered seating area of the shaft.

In testimony whereof, I have hereunto set my hand at Chicago, Illinois, this 30 day of October, 1924.

WILLIAM H. SCHULZE.